United States Patent
Hagenstad

[15] 3,650,334
[45] Mar. 21, 1972

[54] ROTARY CULTIVATOR ASSEMBLY

[72] Inventor: Roy W. Hagenstad, Crosslake, Minn. 56442

[22] Filed: Jan. 2, 1970

[21] Appl. No.: 241

[52] U.S. Cl. ............................ 172/540, 172/253, 172/546, 172/556, 172/558
[51] Int. Cl. .................................................. A01b 21/04
[58] Field of Search ................. 172/604, 557, 599, 536, 540, 172/548, 550, 177, 532, 349, 118, 518, 547, 245, 253, 184, 185, 568, 186, 600; 56/377; 171/93, 341, 95, 116, 128; 308/19, 181; 83/664

[56] References Cited

UNITED STATES PATENTS

| | | | |
|---|---|---|---|
| 1,084,166 | 1/1914 | Petersen | 172/185 |
| 2,022,335 | 11/1935 | Bernthal | 172/547 |
| 3,306,371 | 2/1967 | Bush | 172/540 |
| 617,070 | 1/1899 | Anderson | 172/547 |
| 3,437,154 | 4/1969 | Anesi | 172/548 |
| 2,693,748 | 11/1954 | Kiser | 172/600 |
| 2,664,040 | 12/1953 | Beard | 172/548 |
| 2,227,772 | 1/1941 | Walker | 172/540 |
| 2,525,545 | 10/1950 | Hanson | 172/536 |
| 2,319,899 | 5/1943 | Silver | 172/177 |
| 2,635,403 | 4/1953 | Gandrud | 172/548 |

Primary Examiner—Robert E. Bagwill
Assistant Examiner—C. W. Hanor
Attorney—Schroeder, Siegfried & Ryan

[57] ABSTRACT

A rotary cultivator assembly comprising a support having an attachment extremity and a shaft extremity with a bearing assembly mounted on the shaft. The bearing assembly has a predetermined cross section and mounts tubular hubs in varying lengths in a cantilever manner to permit the mounting of a variable number of spider units or cultivator wheels on the same with the entire assembly being held in assembled relationship by means of an end cap and a flange on the bearing assembly and tie bolts extending therebetween.

11 Claims, 5 Drawing Figures

INVENTOR.
Roy W. Hagenstad
BY
Schroeder Siegfried & Ryan
ATTORNEYS

INVENTOR.
Roy W. Hagenstad
BY
Schroeder Siegfried & Ryan
ATTORNEYS

ROTARY CULTIVATOR ASSEMBLY

My invention relates to rotary cultivator assemblies and more particularly to an improved rotary cultivator assembly in which a plurality of cultivating discs or spiders may be gang mounted with the number readily interchanged to vary the number of cultivators and the width of the assembly for varying cultivating conditions.

Rotary cultivator assemblies in the past have employed frames of fixed dimension which support a shaft mounting a plurality of side-by-side cultivators for rotation in conventional cultivating operations. Such structures are fixed in size and number of cultivating spiders. Therefore they require different sized cultivator assemblies for varying cultivator operations. This is particularly true where crop types and growth varies the width of the spacings between row crops. Under such conditions a plurality of tools are required to perform the same function since present day tools do not permit adjustment of the width and the number of cultivator elements of the cultivator assembly to meet these conditions. The same problem exists whether the frame supports the shaft mounting the plurality of rotary cultivating elements at each extremity or whether a single support is provided for a transversely extending shaft in which a fixed number of cultivating elements are positioned on either side of the support and on the shaft.

In the present invention an improved rotary cultivator assembly is provided which is adjustable in size and provides a cantilever type support with a bearing structure upon which varying length hubs may be mounted with the hubs supporting the individual cultivating elements and spacing the same through spacers to permit any width of cultivator assembly and any number of cultivating elements to meet requirements for varying cultivating conditions. In this improved rotary cultivating assembly, the supporting shaft mounts a bearing structure which is sealed and adapted to receive hubs of varying lengths with the hubs being shaped to mount a plurality of cultivating elements and spacers and to permit tie bolts to secure the entire assembly to the bearing frame for a simplified cultivator assembly which will be readily expanded or reduced in size and will permit interchange of varying types of cultivating elements without requiring a special tool for each cultivating operation.

The improved rotary cultivator assembly is particularly adapted for high speed row crop cultivation, weed control, chemical incorporation, soil conditioning and mulching of practically all row crops. It is readily adjustable so that it may be positioned in varied angular positions on its support mounting so that it may be tilted at varying angles permitting the cultivator elements to throw soil toward or away from plants. Similarly the improved assembly permits usage with varying row spacings and under varying crop growth conditions. For the manufacturer, distributor and user, it does present a definite advantage in permitting building and stocking of standard parts with varying size hubs which will permit combining varying numbers of cultivating elements into a single assembly, thereby reducing cost of manufacture, distributing and purchase costs for the user.

It is therefore the principle object of the invention to provide an improved rotary cultivator assembly.

Another object of this invention is to provide a rotary cultivator assembly which receives and mounts varying length hubs to mount varying numbers of cultivator spiders or elements to vary the size of the cultivator.

A further object of this invention is to provide a simplified rotary cultivator assembly which is extremely rugged in construction and is readily adjustable to vary the size of the same.

These and other objects of this invention will become apparent from reading of the attached description together with the drawings wherein.

Figure 1:
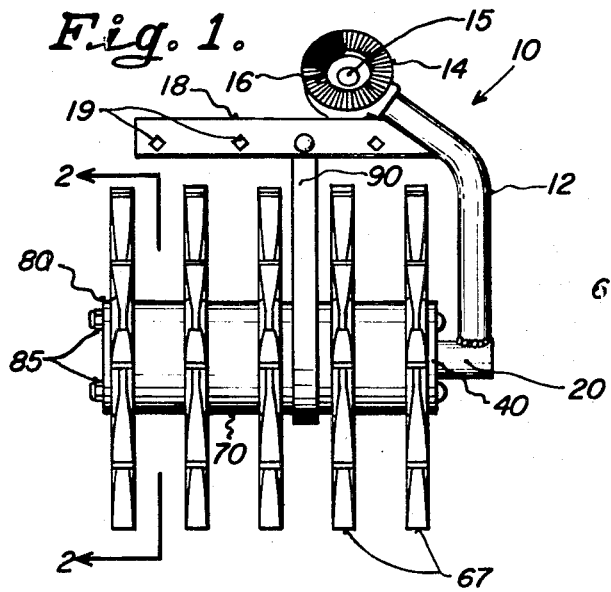
FIG. 1 is an elevation view of the improved rotary cultivator assembly.

My improved rotary cultivator assembly is shown in the drawings generally at 10. It includes a support frame 12 which is generally L-shaped in configuration and has a circular mounting head 14 or attachment extremity, sometimes identified as a knuckle, by means of which the assembly can be attached to an arm and mounted on a cultivating frame, as will be hereinafter identified. The knuckle or attachment extremity includes an aperture 15 therethrough and a serrated or radially toothed surface 16 for purposes to be later noted. Adjacent this attachment extremity and formed integral therewith is a straight bar mounting flange 18 having a plurality of apertures 19 therein. The frame is a tubular metal structure which is curved along its extent and includes a transversely extending shaft portion or extremity 20 opposite the mounting extremity which extends generally parallel to the mounting flange 18 but short of the length thereof.

Figure 3:
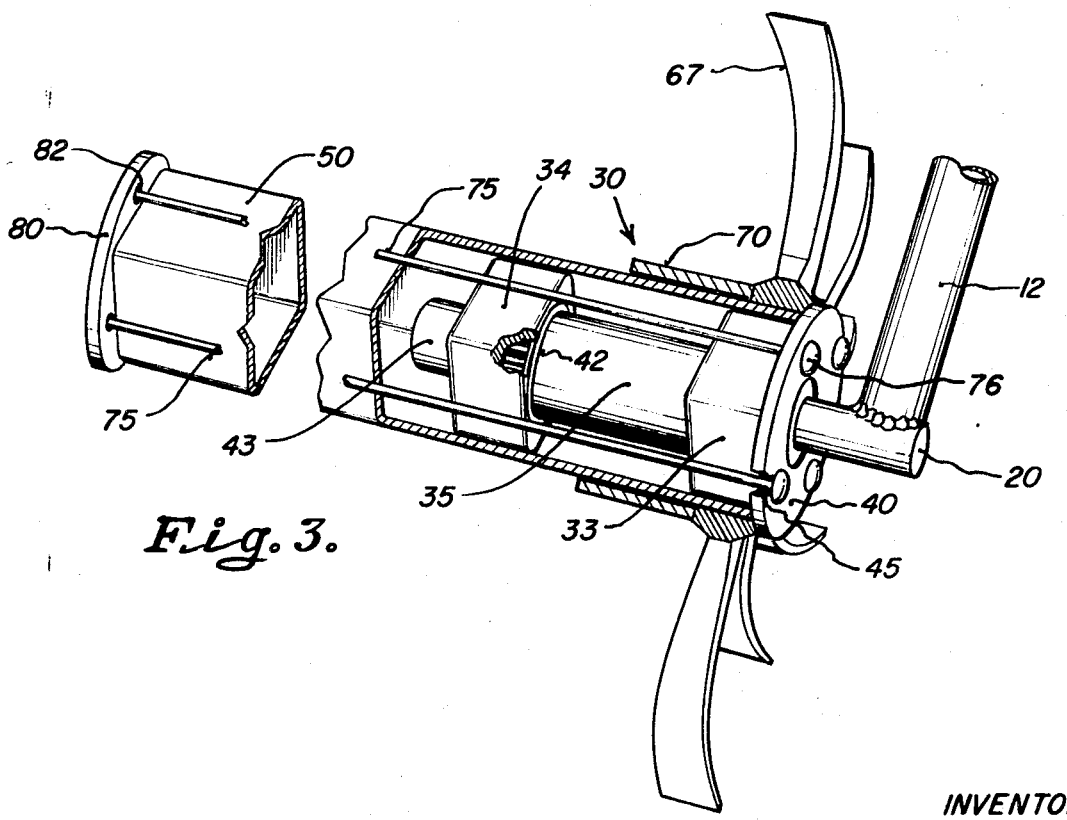
FIG. 3 is a perspective view of a portion of the rotary cultivator assembly with parts in section.
Figure 4:
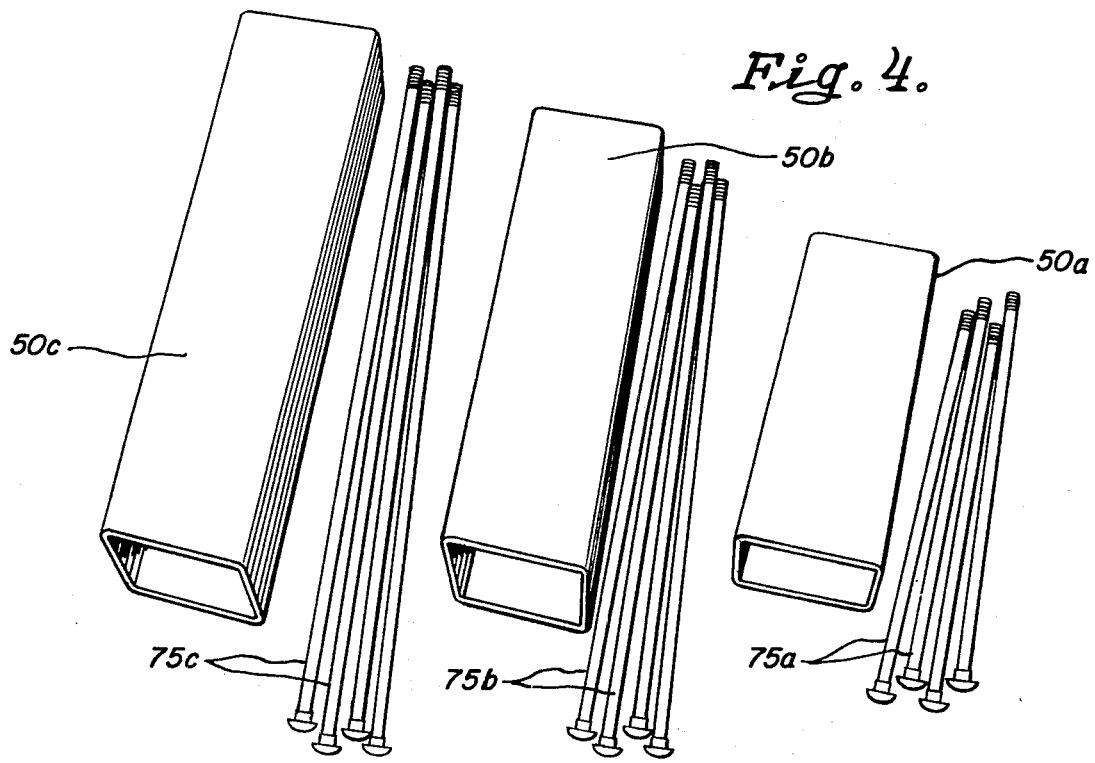
FIG. 4 is a plan view of the hub portion of the rotary cultivator assembly in varying sizes.

The shaft extremity or shaft 20 of the cultivator assembly mounts a bearing assembly, indicated generally at 30, as best seen in FIG. 3, which includes at the ends of a structure a pair of bearing mounting blocks 33, 34 with a cylindrical spacer structure 35 positioned therebetween and a circular flange member 40 attached at one extremity thereof. The bearing mounting blocks 33, 34 include bearings 42, as shown in the broken away portion, which journal the bearing mounting assembly on the shaft and a suitable sealing cup 43 at the free extremity of the same encloses the end of the shaft and provides a grease seal for the assembly. Although not shown, a suitable grease fitting is positioned in the circular flange to permit the introduction of a lubricant into the bearing assembly. The bearing mounting structures are generally square in cross section, for purposes to be later noted, and the circular flange 40 which is formed integral therewith or attached thereto, has a diametrical dimension greater than the cross-sectional dimensions of the bearing mounting hubs 33, 34 and includes a plurality of apertures 45 spaced around the peripheral extent of the same and located above and between the sides or surfaces of the bearing mounting hubs. This bearing mounting structure is designed to mount a square tube of varying lengths such that the tube will fit over the bearing mounting structures 33, 34 and be slidably mounted thereon. The tubes or hub members, indicated at 50, will come in varying lengths, such as is indicated in FIG. 4 at 50a, 50b and 50c for the purpose of providing variable length mounting supports for varying numbers of cultivating discs or spider units, indicated generally at 60.

Figure 2:
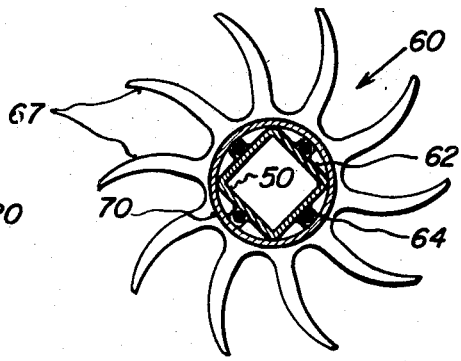
FIG. 2 is a sectional view of the cultivator assembly of FIG. 1 taken along the lines 2—2 therein.

As will be best seen in the sectional view in FIG. 3, the tube or hub 50 is positioned over the bearing assembly and a plurality of the spider units or cultivating wheels are positioned thereon with circular spacer members 70 positioned therebetween to space the same along the extent of the cultivator mounting assembly. The individual spider units have an aperture mounting recess therethrough which is square in cross section, as indicated at 62 in FIG. 2, with additional grooved recesses 64 along the sides of the square configuration for the purpose of passing bolts 75 therebetween. These spider units may take varying forms and normally have a circular hub portion with a plurality of arcuate extending tines, such as is indicated at 67, or fingers which may vary in cross-sectional shape and perform the digging or cultivating operation in the spider. The cylindrical spacers 70 slide over the tubes 50 and bear against the corner projections of the same operating to space the individual spider units along the extent of the tube in any desired number of mountings for the same. Normally such a cultivator mounting assembly will employ either three, four or five spider units with individual spacers therebetween. The entire assembly is held in assembled relationship by means of a circular end cap 80 having apertures 82 therein. The end cap is of the same diametrical dimension and as the circular flange 40 of the bearing assembly and the apertures 82 therein are positioned radially and spaced about the peripheral surface in the same manner that the apertures 45 are positioned in the circular flange 40. Tie bolts 75 having a headed portion 76 extend from the circular flange and through the spacer members and the recesses 64 in the hubs of the spider unit being disposed external of the surface of the tube 50 and through the apertures 82 in the end cap 80. The threaded extremity mounts nuts 85 which when tightened secure the assembly of tube, spider units and spacers in assembled relationship to the flange and on the bearing assembly which is rotatably mounted on the shaft 20 and translationally secured against movement thereon. Thus the entire cultivator mounting assembly provides a cantilever type mounting for the cultivating units or spiders which will be positioned on the mounting tubes or hubs 50 in any number depending upon the length of the tube and the bolts 75. Thus as will be seen in FIG. 4, the tubes 50a, b, and c of varying lengths will provide a mounting for three, four and five cultivating units respectively with the bolts 75 being of commensurate length to insure clamping of the end cap 80 and the entire assembly therebetween to the circular flange 40 of the bearing assembly and on the shaft 20. In addition, the mounting flange 18 will provide aligned mounting through the apertures 19 of a plurality of flat scraper members or blades 90 which extend from the flange toward the assembly of spacers and cultivating units and will be curved around the extent of the same and be positioned between adjacent cultivating units for the purpose of cleaning the same. The use of such cleaners or cleaning metal is optional, however.

Figure 5:
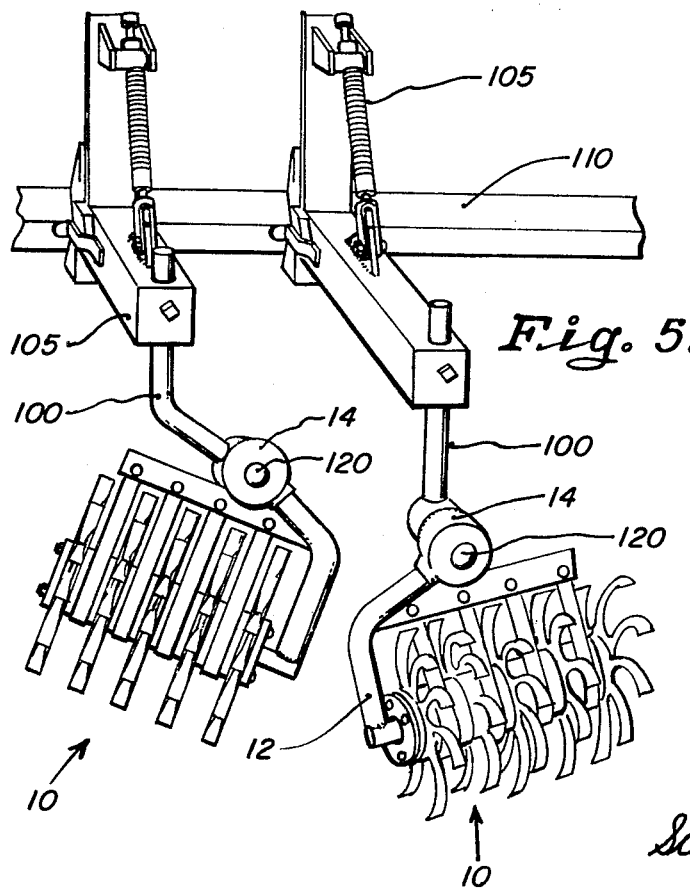
FIG. 5 is a perspective view of a plurality of rotary cultivator assemblies on a cultivator frame.

As will be seen in FIG. 5, the individual cultivator assemblies are mounted through their knuckle or circular mounting heads to an arm 100, the latter being connected to a mounting bracket, indicated generally at 105, and connected to a frame part 110 of a cultivator (not shown). The mounting arms may be straight or bent and each include a knuckle or circular mounting head with similar serrations and an aperture at the center of the same to permit the cultivator assembly to be angularly positioned with respect to the arm 100 through varying limited angles and to be retained in such relationship by means of a nut and bolt means, indicated at 120, extending through the apertures in the knuckles or circular mounting brackets.

Depending upon the type of crop rotation, spacing, and condition of the plantings, it may be desired to utilize the cultivator mounting assemblies with varying numbers of spider units or cultivating blades on the assembly. In addition, it may be desired to use spider units with varying shaped teeth or fingers, and the assembly is readily capable of disassembly and change in the number of mounting units and/or number of spider units and the shape of the same by changing the tube or mounting hub and the length of the bolts and reassembly of the individual spider units and spacers in the appropriate number thereon. Thus the width of the cultivator assembly is readily adjustable and permits the use of a single cultivator assembly for varying row conditions and varying cultivating conditions without the requirement of a separate tool for each function. This improved rotary cultivator assembly eliminates not only additional equipment costs from the standpoint of the usage but permits the manufacturer and distributor to standardize on parts and store and sell assemblies which may be adjustable or sized to fit a particular application. The mounting frame and its parts together with the bearing assembly are made of a steel to be rugged in construction having long life and ease in assembly and usage.

In considering this invention it should be remembered that this disclosure is illustrative only and the scope of the invention should be determined by the appendent claims.

What is claimed is:

1. A rotary cultivator assembly comprising, an L-shaped support frame including an attachment means near one extremity of the same and a transversely extending shaft at the other extremity of the same, a hub assembly including elongated bearing means positioned on the shaft of the support frame and journaled thereon, said bearing means having polygonal external peripheral surfaces, an elongated hollow hub member having the same polygonal cross section and fitted over the polygonal shaped peripheral surfaces of the bearing means and extending beyond the same, a plurality of cultivator spiders each having a central aperture with the same polygonal outline fitted over the hub member and mounted thereon and spaced in side-by-side relationship, spacer means positioned on the hub member and between the rotary cultivator spiders to space the same, and means securing the cultivating spiders and spacers together with the hub member to the bearing means, said bearing means including a flange against which the hub member abutts when positioned on the bearing means and to which the means securing the cultivator spiders and hub member to the bearing means attaches.

2. The rotary cultivator assembly of claim 1 in which the polygonal cross section of the hub member and the apertures in the rotary cultivating spiders is square with the bearing means having a square external peripheral surface for mounting the hub member thereon.

3. The rotary cultivator assembly of claim 1 in which the means securing the cultivator spiders with the spacers therebetween and the hub member to the bearing means includes an end cap positioned over the end of the hub member and with bolt means extending from the end cap to the flange of the bearing means and being secured thereto.

4. The rotary cultivator assembly of claim 3 in which the plurality of rotary cultivator spiders at the central openings therein have notches to pass the bolt means extending between said flange of the bearing means and the end cap.

5. The rotary cultivator assembly of claim 4 in which the elongated bearing means includes a bearing assembly having incorporated therewith said flange of the bearing means and spacer means with the spaced-bearing mounting structures having individual bearings therein journaling the bearing assembly on the translationally extending shaft.

6. The rotary cultivator assembly of claim 1 and including a flange portion connected to the L-shaped support frame near said one extremity and extending parallel to said shaft with a plurality of mounting apertures therein adapted to mount metallic cleaning rods extending from said apertures and connected thereto and between the spiders journaled on the hub assembly.

7. The rotary cultivator assembly of claim 1 in which the attachment means near the extremity of the L-shaped support frame includes a cylindrical hub with a bolt receiving aperture therethrough and a serrated surface encircling the aperture and adapted to co-operate with a similar serrated connecting part to adjustably position the support frame at varying angular positions with respect to a supporting structure.

8. A rotary cultivator assembly comprising, a cantilever type support having attachment means at one extremity and a supporting shaft at the other extremity, elongated bearing means mounted on the shaft, a hub member slidably positioned over the bearing means and drivingly connected thereto to be journaled on the shaft, and means including a plurality of rotary cultivating spiders and spacers telescopically fitted over the hub member and mounted thereon for rotation therewith, said last named means including means for holding the hub member and the rotary cultivating spiders in assembled relationship on said bearing means, said means having the plurality of rotary cultivating spiders including the plurality of spiders with spacers therebetween fitted over the hub member in non-rotative relationship therewith and bolt means extending between the bearing means and a retaining flange abutting the hub member and one of the spiders.

9. The rotary cultivator assembly of claim 1 in which the elongated bearing means is a mounting frame with a pair of spaced bearings therein attached to the shaft and journaling a portion of the bearing means thereon.

10. The rotary cultivator assembly of claim 1 in which the driving connection between the bearing means and the hub member is provided by a polygonal external peripheral surface on the bearing means and a similar interior surface on the hub member to telescopically fit over the bearing means.

11. The rotary cultivator assembly of claim 10 in which the cantilever type support includes attachment means at one extremity having a mounting aperture therethrough and a serrated adjustment surface surrounding the mounting aperture and adapted to adjustably position the same on a supporting part.

* * * * *